United States Patent
Ikeda

(10) Patent No.: US 8,242,036 B2
(45) Date of Patent: Aug. 14, 2012

(54) ADHESIVE RESIN COMPOSITION AND LAMINATE

(75) Inventor: Chikako Ikeda, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1154 days.

(21) Appl. No.: 12/065,049

(22) PCT Filed: Sep. 1, 2006

(86) PCT No.: PCT/JP2006/317377
§ 371 (c)(1), (2), (4) Date: Feb. 27, 2008

(87) PCT Pub. No.: WO2007/026893
PCT Pub. Date: Mar. 8, 2007

(65) Prior Publication Data
US 2009/0104830 A1    Apr. 23, 2009

(30) Foreign Application Priority Data

Sep. 2, 2005 (JP) .................... 2005-255193
Jun. 9, 2006 (JP) .................... 2006-161184

(51) Int. Cl.
*B32B 27/32* (2006.01)
*B32B 27/12* (2006.01)

(52) U.S. Cl. ........ 442/290; 442/398; 428/483; 428/515; 525/221

(58) Field of Classification Search .................. 428/483, 428/461, 515; 442/290, 398; 525/221
See application file for complete search history.

(56) References Cited

FOREIGN PATENT DOCUMENTS

| JP | 4-036338 | 2/1992 |
|---|---|---|
| JP | 6 25367 | 2/1994 |
| JP | 7 149970 | 6/1995 |
| JP | 7 207082 | 8/1995 |
| JP | 9 111069 | 4/1997 |
| JP | 10 279774 | 10/1998 |
| JP | 2000 186174 | 7/2000 |
| JP | 2000 198860 | 7/2000 |
| JP | 2001 98121 | 4/2001 |
| JP | 2001 261905 | 9/2001 |
| JP | 2001 294837 | 10/2001 |
| JP | 2002 194174 | 7/2002 |
| JP | 2002-194174 | * 7/2002 |
| JP | 2004 25460 | 1/2004 |
| JP | 2004-025460 | * 1/2004 |
| WO | WO 00/59990 | 10/2000 |

OTHER PUBLICATIONS

Chinese Office Action issued on Aug. 24, 2010 in corresponding Chinese Application No. 200680031910.X (with English Translation).
Office Action issued May 29, 2012, in JP Patent Application No. 2006-161184.

* cited by examiner

*Primary Examiner* — James J Seidleck
*Assistant Examiner* — Deve E Valdez
(74) *Attorney, Agent, or Firm* — Oblon, Spivak, McClelland, Maier & Neustadt, L.L.P.

(57) ABSTRACT

An adhesive resin composition excellent in adhesiveness and heat resistance thereof, film-forming properties, and film quality and a laminate having an adhesive resin layer made of this adhesive resin composition are provided.
The Composition is an adhesive resin composition comprising 10-99.5% by weight resin ingredient (A), 0.5-30% by weight another resin ingredient (unsaturated-carboxylic-acid-modified polypropylene), and 0-89.5% by weight still another resin ingredient (olefin resin).
Resin ingredient (A): a product of successive propylene polymerization comprising 10-60% by weight (propylene homopolymer) component and 40-90% by weight (propylene/ethylene copolymer) component. The contents of room-temperature-xylene solubles derived from (a2), room-temperature-xylene insolubles derived from (a2), and room-temperature-xylene solubles derived from the same are 1-20% by weight, lower than 20% by weight, and 10-60% by weight, respectively, based on resin ingredient (A). The room-temperature-xylene solubles derived from (a2) have a content of α-olefins excluding propylene of 20% by weight or higher.

21 Claims, No Drawings

ADHESIVE RESIN COMPOSITION AND LAMINATE

TECHNICAL FIELD

The present invention relates to an adhesive resin composition and a laminate. More particularly, the invention relates to an adhesive resin composition which is excellent in adhesiveness and heat resistance thereof, film-forming properties, and film quality and is useful in laminate production by coextrusion molding, extrusion laminating, or coextrusion laminating/molding, and to a laminate having an adhesive resin layer made of this adhesive resin composition.

The laminate of the invention is useful as a packaging material for foods or medical or cosmetic articles, a packaging material for industrial parts, etc.

BACKGROUND ART

For producing a packaging material for foods or medical or cosmetic articles, a packaging material for industrial parts, or the like, a technique has been employed in which an olefin resin such as an ethylene resin or propylene resin is laminated to a base such as, e.g., any of various resin films or sheets, any of various metal foils or sheets, or paper through an adhesive resin layer to produce a laminate and thereby impart properties such as thermal fusion bondability, water vapor barrier properties, water proofness, and rust preventive properties to the base.

A packaging material effective in inhibiting the contents from oxidatively deteriorating in quality is being provided which comprises a polyolefin resin layer excellent in formability, rigidity, and resistance to the contents and an ethylene/vinyl alcohol copolymer resin (EVOH) layer formed over the polyolefin resin layer through an adhesive resin layer to impart oxygen barrier properties to the polyolefin resin layer.

Examples of laminating methods for producing such packaging materials include glue laminating in which a base is bonded to an olefin resin film or sheet with an adhesive to produce a laminate and extrusion laminating in which an olefin resin is extrusion-laminated to a base through an anchor coat to produce a laminate.

In the case of producing the laminated film or sheet comprising a polyolefin resin layer and an EVOH layer superposed thereon through an adhesive resin layer, coextrusion molding is frequently used.

Adhesive resin compositions for use in such laminates, laminated sheets, or laminated films are required to have high-temperature adhesiveness as well as initial adhesiveness and long-term adhesiveness. Namely, in applications such as, e.g., food packaging materials to be subjected to a high-temperature treatment such as retortion or boiling sterilization or industrial materials to be used at high temperatures, heat-resistant adhesiveness is important. There are cases where the adhesive resin compositions are further required to have transparency for ascertaining the contents and mechanical strength.

JP-A-2002-194174 proposes the following composition as such an adhesive resin composition.

"An adhesive resin composition characterized by comprising the following resin ingredient (A) and the following resin ingredient (B) in amounts of 10-99.5% by weight and 0.5-30% by weight, respectively, based on all resin ingredients (100% by weight):

resin ingredient (A): a propylene polymer comprising the following component (a1) and component (a2) and obtained by yielding component (a1) by polymerizing and then producing component (a2) by polymerization, component (a1): a propylene homopolymer having an isotactic index of 90% or higher or a copolymer of propylene and another α-olefin having 2-8 carbon atoms, the amount of component (a1) being 10-60% by weight based on the whole resin ingredient (A), component (a2): a copolymer of propylene as an essential component and one or more other α-olefins having 2-8 carbon atoms including ethylene as another essential component, wherein the content of room-temperature-xylene insolubles in the copolymer is higher than 20% by weight and not higher than 70% by weight based on the whole resin ingredient (A), the content of room-temperature-xylene solubles in the copolymer is 10-60% by weight based on the whole resin ingredient (A), and the room-temperature-xylene solubles have a content of α-olefins excluding propylene lower than 20% by weight, the amount of component (a2) being 40-90% by weight based on the whole resin ingredient (A); and resin ingredient (B): polypropylene modified with an unsaturated carboxylic acid or anhydride thereof so that the content of the unsaturated carboxylic acid or anhydride thereof is 0.01% by weight or higher."

Incidentally, the resin ingredient (A) contained in that adhesive resin composition is one obtained by successive polymerization in which component (a1) is yielded by polymerization and component (a2) is then yielded by polymerization. This resin ingredient (A), which is obtained by such successive polymerization, has a structure comprising a sea phase constituted of component (a1) and an island phase constituted of component (a2) evenly dispersed as fine particles in the sea phase.

A polyolefin composition obtained by such successive polymerization is disclosed in JP-A-6-25367. However, JP-A-6-25367 includes no suggestion about any formulation for use as an adhesive resin composition.

Patent Document 1: JP-A-2002-194174
Patent Document 2: JP-A-6-25367
Patent Document 3: JP-A-2001-294837

DISCLOSURE OF THE INVENTION

Problems that the Invention is to Solve

The adhesive resin composition disclosed in JP-A-2002-194174 shows excellent properties concerning adhesiveness, heat-resistant adhesiveness, transparency, impact resistance, etc. However, this composition is apt to develop fish-eyes during film formation. A further improvement in the appearance of laminates to be obtained therewith is hence desired. In particular, since polyester resins have excellent transparency, it is important to diminish the formation of fish-eyes in the adhesive resin layer during laminating.

In the field of food packaging, the technique of laminating a polyolefin with a gas barrier resin represented by ethylene/vinyl alcohol copolymers to produce a multilayered container for the purpose of prolonging the storage period of the contents is well known. Although a maleic-anhydride-modified polyolefin has been used as a resin for use in such multilayered containers, the modified polyolefin resin according to the prior-art technique has been unable to adhere to polyester resins.

Recent trends in packaging containers include the following. A polyester resin having excellent gloss is used as a surface layer for the purpose of enabling the packaging container to give a high-grade feeling. A polyester resin is used on the side which comes into contact with the contents so as to take advantage of the flavor-keeping properties characteristics of polyester resins. Furthermore, a polyester resin layer vapor-deposited with silica or alumina is used in place of the ethylene/vinyl alcohol copolymer, which has reduced gas barrier properties in high-humidity atmospheres, or in place of aluminum, which makes it impossible to conduct an inspection with a metal detector. Thus, laminates including a polyester resin as a component have been proposed.

However, the adhesive composition containing a tackifier as an essential ingredient, which is a well known technique for laminating a polyester resin with a polyolefin, is deficient in adhesion strength in high-temperature atmospheres and, hence, tends to have limited applications. Examples of phenomena caused by such insufficient adhesion strength include one in which the polyolefin readily peels off at the interface between it and the polyester resin when the packaging material undergoes a heat history involving a heat sealing step in secondary processing, boiling sterilization, or the like or when an external force is applied to the packaging material in a heated state, for example, in the step of deburring or the step of demolding during bottle molding.

Furthermore, in producing that adhesive resin, the tackifier begins to melt at around 40° C. and is hence difficult to handle. Moreover, that adhesive resin has the problem of smoking during laminate production because the tackifier is unstable to a heat history. There has hence been a problem that the resin fouls the molding machine and exerts an adverse influence on the working environment.

The invention provides a technique which can eliminate all those problems.

Namely, the invention provides a technique in which a polypropylene resin excellent in heat resistance and moldability is used without using any substance unstable to heat, whereby a sufficiently practicable strength of adhesion to polyester resins can be exhibited.

Although this technique provides a polypropylene resin, it is an epochal material which also enables laminating with polyethylene resins as a different kind of resin.

Means for Solving the Problems

The present inventors made intensive investigations in order to overcome the problems described above. As a result, it was found that by changing the composition of the resin ingredient (A) in the adhesive resin composition disclosed in JP-A-2002-194174, fish-eyes can be diminished while maintaining the excellent properties of the resin composition, such as transparency, adhesiveness, heat-resistant adhesiveness, and impact resistance, whereby an adhesive resin composition excellent in film-forming properties and film quality can be provided. The invention has been achieved based on this finding. The essential points of the invention are as follows.

[1] An adhesive resin composition characterized by comprising 10-99.5% by weight the following resin ingredient (A), 0.5-30% by weight the following resin ingredient (B), and 0-89.5% by weight the following resin ingredient (C) as resin ingredients:

resin ingredient (A): a product of successive propylene polymerization which is a polymer comprising 10-60% by weight the following component (a1) and 40-90% by weight the following component (a2) and obtained by yielding component (a1) by polymerization and then yielding component (a2) by polymerization and in which the content of room-temperature-xylene solubles derived from component (a1) is 1-20% by weight based on resin ingredient (A), the content of room-temperature-xylene insolubles derived from component (a2) is lower than 20% by weight based on resin ingredient (A), the content of room-temperature-xylene solubles derived from component (a2) is 10-60% by weight based on resin ingredient (A), and the room-temperature-xylene solubles derived from component (a2) have a content of α-olefins excluding propylene of 20% by weight or higher, component (a1): a propylene homopolymer or a copolymer of propylene and one or more other α-olefins having 2-8 carbon atoms, component (a2): a copolymer of propylene as an essential component and one or more other α-olefins having 2-8 carbon atoms including ethylene as another essential component;

resin ingredient (B): a propylene homopolymer or a propylene copolymer which each has been modified with at least one unsaturated carboxylic acid and/or derivative thereof so that the content of the component derived from the unsaturated carboxylic acid and/or derivative thereof is 0.01% by weight or higher; and resin ingredient (C): an olefin resin.

[2] The adhesive resin composition as described under [1], characterized in that resin ingredient (B) has an MFR (hereinafter referred to as "MFR$(180)_B$") of 30-1,000 g/10 min (180° C., 2.16-kg load), and the ratio of this MFR of resin ingredient (B) to the MFR of resin ingredient (A) (g/10 min (230° C., 2.16 kg)) (hereinafter referred to as "MFR$(230)_A$"), i.e., MFR$(180)_B$/MFR$(230)_A$, is 1-10,000.

[3] The adhesive resin composition as described under [1] or [2], characterized in that the room-temperature-xylene solubles in component (a2) have an ethylene content of 20-40% by weight based on resin ingredient (A).

[4] The adhesive resin composition as described under [1] to [3], characterized in that component (a2) in resin ingredient (A) is a copolymer of propylene and ethylene.

[5] The adhesive resin composition as described under [1] to [4], characterized in that component (a1) in resin ingredient (A) is a propylene homopolymer.

[6] The adhesive resin composition as described under [1] to [4], characterized in that component (a1) and component (a2) in resin ingredient (A) each are a copolymer of propylene and ethylene.

[7] The adhesive resin composition as described under [1] to [6], characterized in that resin ingredient (A) has a flexural modulus of from 50 MPa to lower than 300 MPa (lower than about 3,000 kg/cm$^2$).

[8] The adhesive resin composition as described under [7], characterized in that resin ingredient (A) has a tensile strength at yield point of 3 MPa or higher.

[9] The adhesive resin composition as described under [7] or [8], characterized in that resin ingredient (A), when examined for melting point by the DSC method, has a peak top value Tm of 162° C. or lower.

[10] The adhesive resin composition as described under [1] to [9], characterized in that resin ingredient (A) has an MFR $(230)_A$ of 0.1-50 g/10 min.

[11] The adhesive resin composition as described under [1] to [10], characterized in that resin ingredient (C) is a propylene homopolymer or a copolymer of propylene and one or more α-olefins and has a propylene content of 5-100% by weight.

[12] A laminate characterized by having an adhesive resin layer made of the adhesive resin composition as described under [1] to [11].

[13] The laminate as described under [12], characterized by being constituted of superposed layers comprising the adhesive resin layer and a layer comprising a material selected from the group consisting of polypropylene resins, polyethylene resins, ethylene/vinyl alcohol copolymer resins, polyamide resins, polyester resins, metals, paper, nonwoven fabrics, and woven fabrics.

[14] The laminate as described under [13], characterized by comprising the adhesive resin layer and a polyester resin layer superposed on at least one side of the adhesive resin layer.

[15] The laminate as described under [13], characterized by comprising the adhesive resin layer and a polyethylene resin layer superposed on at least one side of the adhesive resin layer.

[16] The laminate as described under [13], characterized by comprising the adhesive resin layer, a polyester resin layer superposed on one side of the adhesive resin layer, and a polyethylene resin layer superposed on the other side of the adhesive resin layer.

[17] The laminate as described under [14] or [16], characterized in that the ratio of the thickness of the adhesive resin layer to the thickness of the polyester resin layer is from 1:100 to 1:1.

[18] The laminate characterized in that a polyester resin layer is superposed on the adhesive resin layer so as to be in direct contact with the adhesive resin layer, and the strength of adhesion between the adhesive resin layer and the polyester resin layer is 70 g/cm or higher at each of measuring atmosphere temperatures of 23° C. and 80° C.

[19] The laminate as described under [18], characterized in that the polyester resin layer is a poly(ethylene terephthalate) layer.

[20] The laminate as described under [18], characterized in that the strength of adhesion between the layers is 100 g/cm or higher at each of measuring atmosphere temperatures of 23° C. and 80° C.

[21] The laminate as described under [20], characterized in that the strength of adhesion between the layers is 200 g/cm or higher at each of measuring atmosphere temperatures of 23° C. and 80° C.

Advantages of the Invention

The adhesive resin composition of the invention is excellent in adhesiveness, especially adhesiveness to polyester resins, in particular to PET (poly(ethylene terephthalate) resins), and in the heat resistance thereof because the composition contains resin ingredient (A) obtained by successive polymerization. In addition, since this resin ingredient (A) has a specific composition, an adhesive resin composition which is free from problems concerning defects such as fisheyes and has excellent film-forming properties is provided.

Consequently, the laminate of the invention, which has an adhesive resin layer made of that adhesive resin composition, can be one which, in particular, employs a polyester resin and has excellent adhesion strength, excellent durability thereof, and a satisfactory appearance.

BEST MODE FOR CARRYING OUT THE INVENTION

Embodiments of the adhesive resin composition and laminate of the invention will be explained below in detail. In the following explanations, the term "(co)polymerization" implies both "polymerization" and "copolymerization", respectively.

[Adhesive Resin Composition]

The adhesive resin composition of the invention is explained first.

The adhesive resin composition of the invention comprises, as resin ingredients, 10-99.5% by weight resin ingredient (A), 0.5-30% by weight resin ingredient (B), and 0-89.5% by weight resin ingredient (C), provided that the sum of these is 100% by weight.

<Resin Ingredient (A)>

Resin ingredient (A) is a product of successive propylene polymerization which is a polymer comprising 10-60% by weight the following component (a1) and 40-90% by weight the following component (a2) and obtained by yielding component (a1) by polymerization and then yielding component (a2) by polymerization and in which the content of room-temperature-xylene solubles derived from component (a1) is 1-20% by weight based on resin ingredient (A), the content of room-temperature-xylene insolubles derived from component (a2) is lower than 20% by weight based on resin ingredient (A), the content of room-temperature-xylene solubles derived from component (a2) is 10-60% by weight based on resin ingredient (A), and the room-temperature-xylene solubles derived from component (a2) have a content of α-olefins excluding propylene of 20% by weight or higher.

(Component (a1))

Component (a1) is a propylene homopolymer or a copolymer of propylene and one or more other α-olefins having 2-8 carbon atoms.

In the case where component (a1) is a propylene copolymer, examples of the other α-olefins having 2-8 carbon atoms include one or more of ethylene, 1-butene, 3-methyl-1-butene, 1-pentene, 4-methyl-1-pentene, 1-hexene, 1-octene, and the like. However, ethylene is preferred.

Component (a1) preferably is a propylene copolymer including propylene as the main component. The propylene copolymer including propylene as the main component preferably is one in which structural units derived from propylene are contained in an amount of 70% by weight or larger, preferably 80% by weight or larger, more preferably 85% by weight or larger, and structural units derived from one or more other α-olefins having 2-8 carbon atoms, preferably ethylene, are contained in an amount of 2% by weight or larger, preferably 3% by weight or larger. In case where the content of structural units derived from the α-olefins is lower than 2% by weight, the strength of adhesion to polyester resins, especially PET, tends to decrease. In case where the content of structural units derived from propylene is lower than 70% by weight, heat-resistant adhesiveness (adhesion strength in high-temperature atmospheres) tends to decrease.

It is preferred that component (a1) should have an isotactic index of 80% or higher, especially 90% or higher. Isotactic index substantially corresponds to the content of crystalline components insoluble in room-temperature xylene in this (co)polymer. In case where the isotactic index of component (a1) is lower than 80%, the composition obtained tends to have poor heat resistance.

Component (a1) comprises the room-temperature-xylene insolubles and room-temperature-xylene solubles of a propylene (co)polymer discharged in a first stage of polymerization. The value obtained by subtracting the amount of the room-temperature-xylene solubles contained in component (a1) from the amount of the room-temperature-xylene solubles contained in the whole resin ingredient (A) is the amount of the room-temperature-xylene solubles contained in component (a2). The value obtained by subtracting the amount of the room-temperature-xylene solubles contained in component (a2) from the total amount of the monomers charged in a second stage is the amount of the room-temperature-xylene insolubles contained in component (a2). Resin ingredient (A) is regulated so as to have the composition which will be described later.

(Component (a2))

Component (a2) is a copolymer of propylene as an essential component and one or more other α-olefins having 2-8 carbon atoms including ethylene as another essential component. Examples of the other α-olefins include one or more of ethylene, 1-butene, 3-methyl-1-butene, 1-pentene, 4-methyl-1-pentene, 1-hexene, 1-octene, and the like. Ethylene is preferred of these.

Namely, it is preferred that component (a2) should be a copolymer of propylene and ethylene.

Component (a2) comprises room-temperature-xylene insolubles and room-temperature-xylene solubles. It is regulated so that the content of the room-temperature-xylene insolubles, the content of the room-temperature-xylene solubles, and the content of α-olefins excluding propylene, especially ethylene content, in the room-temperature-xylene solubles are those respective values based on the whole resin ingredient (A) which will be described later.

(Composition of Resin Ingredient (A))

Resin ingredient (A) comprises 10-60% by weight component (a1) described above and 40-90% by weight component (a2) described above, provided that the sum of both is 100% by weight. The contents of component (a1) and component (a2) are preferably 20-50% by weight and 50-80% by weight, respectively. More preferably, the contents of component (a1) and component (a2) are 30-45% by weight and 55-70% by weight, respectively. In case where the content of component (a1) is lower than the lower limit of that range and the content of component (a2) exceeds the upper limit of that range, then the composition obtained has poor heat resistance. On the other hand, in case where the content of component (a1) exceeds the upper limit of that range and the content of component (a2) is lower than the lower limit of that range, the composition obtained is poor in adhesiveness and low-temperature impact resistance.

In resin ingredient (A), the content of room-temperature-xylene solubles derived from component (a1) is 1-20% by weight based on resin ingredient (A), the content of room-temperature-xylene insolubles derived from component (a2) is lower than 20% by weight based on resin ingredient (A), the content of room-temperature-xylene solubles derived from component (a2) is 10-60% by weight based on the whole resin ingredient (A), and the room-temperature-xylene solubles have a content of α-olefins excluding propylene of 20% by weight or higher. Preferably, the content of room-temperature-xylene insolubles derived from component (a2) is 5-17% by weight based on resin ingredient (A), the content of room-temperature-xylene solubles derived from component (a2) is 35-60% by weight based on the whole resin ingredient (A), and the room-temperature-xylene solubles have a content of α-olefins excluding propylene of 20-40% by weight. More preferably, the content of room-temperature-xylene insolubles derived from component (a2) is 5-15% by weight based on resin ingredient (A), the content of room-temperature-xylene solubles derived from component (a2) is 40-60% by weight based on resin ingredient (A), and the room-temperature-xylene solubles have a content of α-olefins excluding propylene of 20-35% by weight based on resin ingredient (A).

In case where the content of room-temperature-xylene insolubles in component (a2) exceeds the upper limit of that range, the strength of adhesion to polyester resins tends to decrease.

In case where the content of room-temperature-xylene solubles in component (a2) is lower than the lower limit of that range, the resin composition is poor in adhesiveness and low-temperature impact resistance. On the other hand, in case where the content thereof exceeds the upper limit of that range, the resin composition has poor transparency.

Furthermore, in case where the room-temperature-xylene solubles in component (a2) have a content of α-olefins excluding propylene which is outside that range, the strength of adhesion to polyester resins tends to decrease.

It is preferred that the content of room-temperature-xylene solubles in component (a1) in resin ingredient (A) should be especially 1-18% by weight, in particular 2-15% by weight, more desirably 3-15% by weight, based on resin ingredient (A). In case where the content of room-temperature-xylene solubles in component (a1) is outside that range, adhesion strength tends to decrease. In case where the content thereof exceeds the upper limit, the resin composition tends to have poor heat-resistant adhesiveness.

(Production of Resin Ingredient (A) by Successive Polymerization)

The propylene polymer as resin ingredient (A) described above is obtained by yielding component (a1) by polymerization and then yielding component (a2) (by polymerization) as stated above.

Catalysts usable in this successive polymerization are not particularly limited. However, it is preferred to use a catalyst comprising an organoaluminum compound and a solid ingredient comprising titanium atoms, magnesium atoms, halogen atoms, and an electron-donating compound as essential components.

The organoaluminum compound may be a compound represented by the general formula $R^1_m AlX_{(3-m)}$ (wherein $R^1$ represents a hydrocarbon residue having 1-12 carbon atoms, X represents a halogen atom, and m is a number of 1-3). Examples thereof include trialkylaluminums such as trimethylaluminum and triethylaluminum, dialkylaluminum halides such as dimethylaluminum chloride and diethylaluminum chloride, alkylaluminum sesquihalides such as methylaluminum sesquichloride and ethylaluminum sesquichloride, alkylaluminum dihalides such as methylaluminum dichloride and ethylaluminum dichloride, and alkylaluminum hydrides such as diethylaluminum halides.

Examples of titanium compounds usable as a titanium atom source in producing the solid ingredient comprising titanium atoms, magnesium atoms, halogen atoms, and an electron-donating compound as essential components include compounds represented by the general formula $Ti(OR^2)_{(4-n)}X_n$ (wherein $R^2$ represents a hydrocarbon residue having 1-10 carbon atoms, X represents a halogen atom, and n is a number of 0-4). Preferred of these are titanium tetrachloride, tetraethoxytitanium, and tetrabutoxytitanium. Examples of magnesium compounds usable as a magnesium atom source include dialkylmagnesiums, magnesium dihalides, dialkoxymagnesiums, and alkoxymagnesium halides. Preferred of these are magnesium dihalides and the like. Examples of the halogen atoms include fluorine, chlorine, bromine, and iodine. Preferred of these is chlorine. The halogen atoms are usually supplied from the titanium compounds or magnesium compounds. However, the halogen atoms may be supplied from another halogen source such as, e.g., a halide of aluminum, halide of silicon, or halide of tungsten.

Examples of the electron-donating compound include oxygen-containing compounds such as alcohols, phenols, ketones, aldehydes, carboxylic acids, organic acids or inorganic acids, and derivatives of these and nitrogen-containing compounds such as ammonia, amines, nitriles, and isocyanates. Preferred of these are inorganic acid esters, organic acid esters, and organic acid halides. More preferred are silicic acid esters, phthalic acid esters, Cellosolve acetates, and phthaloyl halides.

The silicic acid esters especially preferably are organosilicon compounds represented by the general formula $R^3R^4_{(3-p)}Si(OR^5)_p$ (wherein $R^3$ represents a branched aliphatic hydrocarbon residue having 3-20, preferably 4-10 carbon atoms or an alicyclic hydrocarbon residue having 5-20, preferably 6-10 carbon atoms; $R^4$ represents a branched or linear aliphatic hydrocarbon residue having 1-20, preferably 1-10 carbon atoms; $R^5$ represents an aliphatic hydrocarbon residue having 1-10, preferably 1-4 carbon atoms; and p is a number of 1-3). Examples thereof include t-butylmethyldimethoxysilane, t-butylmethyl-diethoxysilane, cyclohexylmethyldimethoxysilane, and cyclohexylmethyldiethoxysilane.

The successive polymerization for producing resin ingredient (A) can be conducted, for example, in the following manner. In the first stage, propylene or both propylene and another α-olefin having 2-8 carbon atoms are fed to conduct the (co)polymerization of the propylene as the main ingredient optionally with the α-olefin in the presence of the catalyst under the conditions of a temperature of 50-150° C., preferably 50-100° C., and a propylene partial pressure of 0.5-4.5 MPa, preferably 1.0-3.5 MPa, to yield component (a1). Subsequently, in the second stage, either propylene and ethylene or propylene, ethylene, and an α-olefin having 4-8 carbon atoms are fed to conduct propylene/ethylene copolymerization or propylene/ethylene/α-olefin copolymerization in the presence of the catalyst under the conditions of a temperature of 50-150° C., preferably 50-100° C., and a propylene partial pressure and an ethylene partial pressure of 0.3-4.5 MPa each, preferably 0.5-3.5 MPa each, to yield component (a2).

Those (co)polymerization operations may be conducted either batchwise, or continuously, or semi-batchwise. The (co)polymerization in the first stage is preferably conducted in a vapor phase or liquid phase. The copolymerization in the second or any subsequent stage also is preferably conducted in a vapor phase or liquid phase, especially in a vapor phase. The residence time in each stage may be 0.5-10 hours, and is preferably 1-5 hours.

In this process, the contents of component (a1) and component (a2) can be regulated by regulating the amount of the monomer(s) to be (co)polymerized in each stage. The isotactic index of component (a1) can be regulated by changing the kind of the catalyst to be used, polymerization conditions, e.g., temperature and pressure, and composition of the monomers to be fed.

The content of room-temperature-xylene solubles in component (a2) can be regulated by regulating the composition of the monomer(s) to be fed in each (co)polymerization stage, the amount of the (co)polymer to be yielded in each stage, and the molecular weight to be regulated with, e.g., hydrogen feed amount. The content thereof can be regulated also by selecting the kind of catalyst.

In the case where the powder particles of the propylene (co)polymer produced by the process described above have a problem such as tackiness, it is preferred that an active-hydrogen-containing compound should be added after the first-stage (co)polymerization or before or during the second-stage copolymerization in an amount which is 100-1,000 times by mole the amount of the titanium atoms in the solid ingredient of the catalyst and is 2-5 times by mole the amount of the organoaluminum compound of the catalyst, in order to impart flowability to the powder particles. Examples of the active-hydrogen-containing compound include water, alcohols, phenols, aldehydes, carboxylic acids, acid amides, ammonia, and amines.

(Properties of Resin Ingredient (A))

The flexural modulus of resin ingredient (A) is preferably from 50 MPa to lower than 300 MPa (lower than about 3,000 kg/cm²), more preferably 50-250 MPa, even more preferably 50-200 MPa, especially preferably 50-150 MPa, most preferably 50-100 MPa. In case where the flexural modulus thereof is outside that range, the strength of adhesion to polyester resins, especially PET, tends to decrease. Especially when the flexural modulus thereof is lower than 50 MPa, the resin composition tends to have poor handleability and be considerably tacky when granulated or molded. Namely, this resin tends to have poor suitability for practical use as a base resin.

The tensile strength at yield point of resin ingredient (A) is preferably 3 MPa or higher, more preferably 5-13 MPa, even more preferably 5-10 MPa, especially preferably 5-8 MPa. In case where the tensile strength at yield point thereof is outside that range, adhesion strength tends to decrease. Especially when the tensile strength at yield point thereof is lower than 3 MPa, the resin composition tends to have poor handleability and be considerably tacky when granulated or molded. Namely, this resin tends to have poor suitability for practical use as a base resin.

It is preferred that resin ingredient (A), when examined for melting point by the DSC method, should have a peak top value Tm of 162° C. or lower. This value is more preferably 120-162° C., even more preferably 130-160° C., especially preferably 135-150° C., most preferably 138-145° C. In case where the peak top value Tm thereof is outside that range, the strength of adhesion to polyester resins, especially PET, tends to decrease.

The MFR (g/10 min (230° C., 2.16 kg)) of resin ingredient (A) is as will be described later.

<Resin Ingredient (B)>

Resin ingredient (B) is a propylene homopolymer or a propylene copolymer which each has been modified with at least one unsaturated carboxylic acid and/or derivative thereof (hereinafter often referred to as "unsaturated carboxylic acid compound") so that the content of the component of the unsaturated carboxylic acid compound is 0.01% by weight or higher (hereinafter, this modified homopolymer or copolymer is often referred to as "modified polypropylene").

(Propylene (Co)Polymer)

Examples of starting materials for the modified polypropylene, i.e., resin ingredient (B), include a propylene homopolymer and random, block, or graft copolymers of propylene as a main component and one or more of α-olefins such as ethylene, 1-butene, 1-pentene, 1-hexene, and 4-methyl-1-pentene, unsaturated carboxylic acids and derivatives thereof, such as acrylic acid and ethyl acrylate, vinyl esters such as vinyl acetate, unsaturated aromatic compounds such as styrene and methylstyrene, and the like. In the case of a propylene copolymer, the propylene content thereof is preferably 50% by weight or higher, especially 80% by weight or higher, more preferably 95% by weight or higher. It is especially preferred that this starting material should be a propylene homopolymer.

(Unsaturated Carboxylic Acid Compound)

The modified polypropylene as resin ingredient (B) can be obtained by modifying such a propylene (co)polymer with one or more of unsaturated carboxylic acids such as, e.g., acrylic acid, maleic acid, fumaric acid, tetrahydrophthalic acid, itaconic acid, citraconic acid, crotonic acid, isocrotonic acid, and Nadic Acid™ (endocis-bicyclo[2.2.1]hept-5-ene-2, 3-dicarboxylic acid) and derivatives thereof. Preferred of these is a propylene (co)polymer modified with maleic acid or maleic anhydride.

(Modification Methods)

Methods for modifying the propylene (co)polymer with an unsaturated carboxylic acid compound are not particularly limited. For example, use can be made of a solution modification method in which an unsaturated carboxylic acid compound and a radical generator or the like are added to a solution of the propylene (co)polymer in an organic solvent and reacted at a temperature of generally 60-350° C., preferably 80-190° C., for 0.5-15 hours, preferably 1-10 hours, to modify the (co)polymer. Alternatively, a melt modification method can be used in which an extruder or the like is used to react the propylene (co)polymer with an unsaturated carboxylic acid compound usually for about 0.5-10 minutes while keeping the propylene (co)polymer in a molten state by heating at a temperature not lower than the melting point of the (co)polymer, e.g., 170-280° C., to thereby modify the (co)polymer.

Whichever modification method is employed, it is preferred to conduct the reaction in the presence of a radical generator for the purpose of efficiently reacting the unsaturated carboxylic acid compound for modification.

(Content of Unsaturated-Carboxylic-Acid Component)

The modified polypropylene to be used is one in which the content of the component of the unsaturated carboxylic acid compound is 0.01% by weight or higher. The content thereof is preferably 0.01-20% by weight, more preferably 0.1-10% by weight, especially preferably 1-8% by weight. In case where the content of the unsaturated-carboxylic-acid component therein is lower than 0.01% by weight, a sufficient adhesion strength cannot be obtained. In case where the content thereof exceeds 20% by weight, this modified polypropylene is difficult to evenly disperse in resin ingredient (A) used in combination therewith, resulting in an adhesion failure.

(MFR)

The MFR (melt flow index) of resin ingredient (B) (MFR $(180)_B$) is preferably 30-1,000 g/10 min (180° C., 2.16-kg load), especially 50-800 g/10 min, in particular 100-500 g/10 min. It is preferred that the ratio of this MFR of resin ingredient (B) to the MFR of resin ingredient (A) described above (g/10 min (230° C., 2.16 kg)) (MFR$(230)_A$), i.e., MFR$(180)_B$/MFR$(230)_A$, should be 1-10,000, especially 1-5,000, in particular 2-2,000, more preferably 3-1,600.

In case where the MFR$(180)_B$ is lower than 30 g/10 min, a sufficient adhesion strength cannot be obtained. In case where the MFR$(180)_B$ exceeds 1,000 g/10 min, this resin ingredient has an insufficient material strength and cannot attain a sufficient adhesion strength.

On the other hand, in case where MFR$(180)_B$/MFR$(230)_A$ is smaller than 1, the mobility of resin ingredient (B) is not sufficiently utilized and a sufficient adhesion strength cannot be obtained. In case where that ratio exceeds 10,000, resin ingredient (B) is in an unevenly dispersed state and this is apt to result in an adhesion failure.

It is preferred that the MFR (g/10 min (230° C., 2.16 kg) of resin ingredient (A) (MFR$(230)_A$) should be 0.1-50 g/10 min, especially 0.1-30 g/10 min. Resin ingredient (A) is an ingredient having the effect of improving moldability.

<Resin Ingredient (C)>

Examples of the olefin resin as resin ingredient (C) include propylene (co)polymers, propylene/α-olefin copolymers, ethylene/α-olefin copolymers, and ethylene (co) polymers.

As the propylene (co)polymers can be used those enumerated above as propylene (co)polymers usable as starting materials for the modified polypropylene as resin ingredient (B) described above.

Examples of the ethylene/α-olefin copolymers include copolymers of ethylene and one or more of α-olefins having 3-18 carbon atoms, such as propylene, 1-butene, 3-methyl-1-butene, 1-pentene, 4-methyl-1-pentene, 4,4-dimethyl-1-pentene, 1-hexene, 4-methyl-1-hexene, 1-heptene, 1-octene, and 1-octadecene. Examples of the propylene/α-olefin copolymers include copolymers of propylene and one or more of α-olefins such as ethylene and 1-butene.

Examples of the ethylene copolymers include ethylene homopolymers such as low-density, medium-density, and high-density polyethylenes (branched or linear) and copolymers of ethylene and one or more of α-olefins having 3-18 carbon atoms, such as propylene, 1-butene, 3-methyl-1-butene, 1-pentene, 4-methyl-1-pentene, 4,4-dimethyl-1-pentene, 1-hexene, 4-methyl-1-hexene, 1-heptene, 1-octene, and 1-octadecene, and vinyl compounds such as vinyl acetate, acrylic acid, methacrylic acid, acrylic esters, and methacrylic esters.

In particular, resin ingredient (C) may be a propylene homopolymer, a copolymer of propylene and an α-olefin, such as ethylene or butene, in which the propylene content is 75-80% by weight, a high-pressure-process ethylene homopolymer, or an ethylene/butene copolymer having an ethylene content of 70-90% by weight.

<Blending of Resin Ingredients (A) to (C)>

The adhesive resin composition of the invention comprises, as resin ingredients, resin ingredient (A): 10-99.5% by weight, preferably 30-95% by weight, more preferably 60-95% by weight;

resin ingredient (B): 0.5-30% by weight, preferably 1-10% by weight, more preferably 1-5% by weight, and resin ingredient (C): 0-89.5% by weight, preferably 0-60% by weight, more preferably 0-30% by weight, provided that the sum of these is 100% by weight.

In case where the content of resin ingredient (A) is lower than 10% by weight, this resin composition is poor in adhesiveness and low-temperature impact resistance. In case where the content thereof exceeds 99.5% by weight, the content of resin ingredient (B), which is an adhesive ingredient, becomes low and this also results in poor adhesiveness.

In case where the content of resin ingredient (B) is lower than 0.5% by weight, adhesiveness is insufficient. In case where the content thereof exceeds 30% by weight, the adhesive resin composition as a whole has a reduced strength.

Resin ingredient (C) is an ingredient to be used according to need. For example, the propylene homopolymer, high-pressure-process ethylene homopolymer, or the like may be used for the purpose of enhancing the nerve (stiffness) of films or imparting moldability. Alternatively, the ethylene- or propylene-based copolymer rubber may be added for the purpose of improving flexibility or adhesion strength. However, contents thereof exceeding 89.5% by weight tend to result in a reduced adhesion strength and, in particular, tend to result in a considerable decrease in heat-resistant adhesiveness at high-temperature. Consequently, the content of resin ingredient (C) is preferably regulated to 89.5% by weight or lower.

<Other Ingredients>

In the invention, a polyolefin elastomer or the like which falls under none of resin ingredients (A) to (C) may be added as a resin ingredient besides the ingredients described above. Furthermore, compounding agents which are generally used in propylene (co)polymer resin compositions may be added according to need besides those resin ingredients as long as this addition does not lessen the effects of the invention.

Examples of such compounding agents include heat stabilizers, antioxidants, antistatic agents, neutralizing agents, rust preventives, nucleating agents, lubricants, antiblocking agents, dispersants, flowability improvers, release agents, flame retardants, colorants, fillers, and pigments.

In particular, it is preferred from the standpoint of practical use to incorporate 0.1-2 parts by weight of an antioxidant of the phenol, sulfur compound, or phosphorus compound type and 0.01-0.2 parts by weight of a neutralizing agent such as, e.g., hydrotalcite per 100 parts by weight of the resin ingredients in the adhesive resin composition of the invention.

<Production Process>

The adhesive resin composition of the invention may be prepared by evenly mixing resin ingredients (A) and (B) described above optionally together with resin ingredient (C) and other additives by means of a tumbler blender, ribbon blender, twin-cylinder blender, Henschel mixer, or the like and then melt-kneading the resultant mixture with a single- or twin-screw extruder, roll mill, Banbury mixer, kneader, Brabender, or the like.

<Applications>

The adhesive resin composition of the invention may be used as an adhesive resin for producing films, sheets, bottles, or tubes by coextrusion with an ethylene/vinyl alcohol copolymer resin. However, it can be used also for adhesion in producing films, blow-molded articles, tubes, or sheets by coextrusion with a polyolefin resin such as a polypropylene resin or polyethylene resin, a polyamide resin, a polyester resin, etc. Furthermore, the adhesive resin composition is usable also for adhesion to metals (including alloys) such as, e.g., carbon steel, stainless steel, aluminum, copper, and nickel, paper, nonwoven fabrics, and woven fabrics. In particular, the excellent adhesion and heat-resistant adhesiveness thereof to polyester resins are worthy of special mention.

[Laminate]

The laminate of the invention is one which has an adhesive resin layer made of the adhesive resin composition of the invention described above.

Examples of the mating material on which the adhesive resin layer made of the adhesive resin composition is superposed in the laminate of the invention include polypropylene resins, polyethylene resins, ethylene/vinyl alcohol copolymer resins, polyamide resins, polyester resins, metals, paper, nonwoven fabrics, and woven fabrics. However, the mating material should not be construed as being limited to these examples in any way.

It is especially preferred that the laminate of the invention should comprise the adhesive resin composition layer made of the adhesive resin composition of the invention and, superposed on at least one side of the adhesive layer, a layer of one resin selected from a polyester resin, a polyethylene resin layer, and a polypropylene resin layer.

Especially preferred are: a constitution in which a polyester resin layer adjoins at least one side of the layer of the adhesive resin composition of the invention; a constitution in which a polyethylene resin layer adjoins at least one side of the layer of the adhesive resin composition of the invention; and a constitution in which a polypropylene resin layer adjoins at least one side of the layer of the adhesive resin composition of the invention. In each of these constitutions, the laminate may have any desired layer constitution.

Furthermore, it is especially preferred that the laminate should be one in which a polyester resin layer adjoins one side of the layer of the adhesive resin composition of the invention and a polyethylene resin layer or polypropylene resin layer adjoins the other side of the adhesive layer. In particular, the laminate including a polyester resin layer and a polypropylene resin layer is useful in applications where heat resistance is necessary.

In such cases, the proportion of the thickness of the layer of the adhesive resin composition of the invention to the thickness of the polyester resin layer is preferably from 1:100 to 1:1.

The term "polyester resin" herein is used as a general term for various ester resins. However, a polyester in general use, such as poly(ethylene terephthalate) or poly(butylene terephthalate) is preferred. Although the polyester resin is not particularly limited, adhesion to poly(ethylene terephthalate), which is in extensive use, is especially satisfactory. Furthermore, laminating with a heat-sealable copolyester obtained by producing poly(ethylene terephthalate) using a glycol ingredient partly replaced by 1,4-cyclohexanedimethanol to thereby regulate the rate of crystallization of the poly(ethylene terephthalate) (typical example: "PET-G" manufactured by Eastman Chemical) is industrially effective. Laminating with poly(cyclohexylenedimethylene terephthalate) comprising 1,4-hexanediol and terephthalic acid as the main components and having improved heat resistance (typical example: "PCT" manufactured by Eastman Chemical") also can give industrially important laminates.

The laminate of the invention is produced, for example, by laminating the adhesive resin composition of the invention to a resinous or another base to be bonded, by a known method, e.g., successive extrusion laminating, sandwich extrusion laminating, or coextrusion laminating. However, it is especially preferred to form a layer of the adhesive resin composition of the invention and a layer of a propylene resin by coextrusion and laminating the resin composition layer to a base by coextrusion laminating to thereby produce a laminate.

<Base>

Examples of the base as a component of the laminate include resinous bases having a thickness of about 5-2,000 μm, such as unstretched or stretched films or sheets made of polyolefin resins such as polyethylene and polypropylene, polyester resins such as poly(ethylene terephthalate), poly(ethylene terephthalate-isophthalate) copolymers, poly(butylene terephthalate), and poly(ethylene naphthalate), polyamide resins such as nylon-6, nylon-12, nylon-66, nylon-MXD6, and nylon-6/66 and saponified ethylene/vinyl acetate copolymers and printed films or sheets obtained by subjecting those films or sheets to surface printing or the like. Examples thereof further include paper bases such as paper and paperboards.

The invention will be explained below by reference to Examples. However, the invention should not be construed as being limited to the following Examples unless the invention departs from the spirit thereof.

[Resin Ingredient (A)]

The production method of the resin ingredients (A) to be used in the following Examples and Comparative Examples, and the analyzing method of the composition or properties are as follows.

<Production Process>

(1) Production of Solid Ingredient Catalyst

Twenty liters of dehydrated and deoxygenated n-heptane was introduced into a stirrer-equipped reaction vessel having a capacity of 50 L in which the atmosphere had been replaced with nitrogen. Subsequently, 4 mol of magnesium chloride and 8 mol of tetrabutoxytitanium were introduced thereinto and reacted at 95° C. for 2 hours. Thereafter, the temperature of the contents was lowered to 40° C., and 480 mL of methylhydropolysiloxane (viscosity, 20 cSt) was added thereto. The resultant mixture was reacted for further 3 hours. Thereafter, the liquid reaction mixture was taken out and the solid ingredient yielded was washed with n-heptane.

Subsequently, 15 L of dehydrated and deoxygenated n-heptane was introduced into the same stirrer-equipped reaction vessel as described above. The solid ingredient obtained was then added thereto in an amount of 3 mol in terms of magnesium atom amount. Furthermore, a liquid mixture obtained by adding 8 mol of silicon tetrachloride to 25 mL of n-heptane was introduced into the reaction vessel over 30 minutes at 30° C. The contents were heated to 90° C. and reacted for 1 hour. Thereafter, the liquid reaction mixture was taken out and the solid ingredient yielded was washed with n-heptane.

Furthermore, 5 L of dehydrated and deoxygenated n-heptane was introduced into the same stirrer-equipped reaction vessel as described above. To this reaction vessel were then introduced 250 g of the titanium-containing solid ingredient obtained above, which had been treated with silicon tetrachloride, 750 g of 1,5-hexadiene, mL of t-butylmethyldimethoxysilane, 10 mL of divinyldimethylsilane, and 225 g of triethylaluminum. The ingredients were kept in contact with one another at 30° C. for 2 hours. Thereafter, the liquid reaction mixture was taken out and the solid matter was washed with n-heptane. Thus, a solid ingredient catalyst was obtained.

In the solid ingredient catalyst obtained, the amount of preliminarily polymerized 1,5-hexadiene was 2.97 g per the titanium-containing solid ingredient.

(2) Two-Stage Polymerization of Propylene/Propylene-Ethylene

Propylene (A-1, A-5, A-X, A-Y, or A-Z) or a combination of propylene and ethylene according to copolymer composition (A-2, A-3, or A-4), triethylaluminum, and the solid ingredient catalyst were continuously fed to a first reactor having a capacity of 550 L at a temperature of 70° C. and an increased pressure (about 3.2 MPa at 70° C.). The solid ingredient catalyst was supplied in such an amount as to result in a polymer production rate of 20 kg/hr. Furthermore, hydrogen was continuously supplied as a molecular weight regulator. Thus, first-stage polymerization was conducted in a liquid phase.

Subsequently, the polymer yielded was introduced into a second reactor having a capacity of 1,900 L via a propylene purge tank. A combination of propylene and ethylene according to a target copolymer composition was continuously fed to the reactor so as to result in a pressure of 3.0 MPa at a temperature of 60° C. Furthermore, hydrogen was continuously supplied as a molecular weight regulator, and an active-hydrogen compound (ethanol) was supplied in an amount which was 200 times by mole the amount of the titanium atoms present in the solid ingredient catalyst supplied in the first stage and was 2.5 times by mole the amount of the triethylaluminum. Thus, polymerization was conducted in a vapor phase. The polymer yielded was continuously transferred to a vessel, and nitrogen gas containing moisture was introduced into the vessel to terminate the reaction (second-stage polymerization).

By the process described above, A-1 to A-5, which were resin ingredients (A) having various room-temperature-xylene soluble contents and room-temperature-xylene insoluble contents, were produced while mainly regulating the amounts of the raw-material monomers (including propylene) to be fed.

<Methods of Analyzing Resin Ingredient (A) for Composition or Properties>

Each resin ingredient (A) obtained above was examined by the methods shown below for the polymerization proportions of component (a1) and component (a2) in the resin ingredient (A), the weight proportions in the resin ingredient (A) of room-temperature-xylene insolubles and solubles contained in component (a1) and component (a2), the isotactic index of component (a1), the content of the α-olefin (ethylene) other than propylene in the room-temperature-xylene solubles contained in component (a2), etc.

(1) Weight Proportions of Component (a1) and Component (a2) in Resin Ingredient (A)

The weight proportion of component (a2) in the resin ingredient (A) (this proportion is referred to as "a2" (% by weight)) was calculated from the weight of the resin ingredient (A) obtained and the total weight of the propylene and ethylene fed for the second-stage polymerization. The weight proportion of component (a1) in the resin ingredient (A) (this proportion is referred to as "a1" (% by weight)) was calculated by determining "100-a2".

(2) Contents of Room-Temperature-Xylene Insolubles and Solubles in Component (a1) and Component (a2)

The polymer yielded through the first-stage polymerization was sampled. One gram of this sample was added to 300 mL of xylene on an oil bath and dissolved therein with stirring at 140° C., which is the boiling point of xylene. The resultant solution was continuously stirred for 1 hour. Subsequently, this solution was cooled to 100° C. in 1 hour with stirring, thereafter transferred to an oil bath for rapid cooling, and then rapidly cooled to 23±2° C. with continuous stirring to precipitate a polymer. This xylene was allowed to stand at 23±2° C. for 20 minutes or longer. The precipitate was taken out by natural filtration through a filter paper (quantitative filter paper manufactured by Advantec Toyo). The filtrate was evaporated to dryness with an evaporator, and the residue was vacuum-dried at 120° C. for 2 hours, subsequently allowed to cool to ordinary temperature, and then weighed to determine the amount of room-temperature-xylene solubles contained in component (a1). This amount was compared with the initial sample amount to thereby calculate the weight proportion of the room-temperature-xylene solubles contained in component (a1) (this proportion is referred to as "a1cxs" (% by weight)).

In the same manner as described above, the amount of room-temperature-xylene solubles contained in the whole resin ingredient (A) yielded was determined and the weight proportion thereof (referred to as "As" (% by weight)) was calculated. From those values, the content of room-temperature-xylene solubles contained in component (a1) (referred to as "a1s" (% by weight)), the content of room-temperature-xylene insolubles contained in component (a1) (referred to as "a1i" (% by weight)), and the content of room-temperature-xylene solubles contained in component (a2) (referred to as "a2s" (% by weight)) each based on the resin ingredient (A) were calculated using a1s=(a1×a1cxs)/100, a1i=a1–a1s, and a2s=As–a1s, respectively.

Furthermore, the content of room-temperature-xylene insolubles contained in component (a2) (referred to as "a2i" (% by weight)) based on the resin ingredient (A) was calculated using a2i=a2–a2s.

(3) Ethylene Content of Room-Temperature-Xylene Solubles in Component (a2)

Those room-temperature-xylene solubles contained in the polymer yielded through the first-stage polymerization and those room-temperature-xylene solubles contained in the whole resin ingredient (A) which were obtained in (2) above were examined for ethylene content (respectively referred to as "Ea1s" (% by weight) and "EAs" (% by weight)) by infrared spectrophotometry using a calibration curve. The ethylene content of the room-temperature-xylene solubles in component (a2) (referred to as "Ea2s" (% by weight)) was calculated using the following equation.

$$Ea2s = (EAs - Ea1s(a1s/As))/(a2s/As)$$

(4) MFR

Measurement was made in accordance with JIS K7210 at temperatures of 230° C. {resin ingredient (A)} and 180° C. {resin ingredient (B)} under a load of 2.16 kg for each resin ingredient.

(5) Density

Measurement was made in accordance with JIS K7112 (method A (water displacement method)).

(6) Vicat Softening Temperature

Measurement was made in accordance with JIS K7023-1974 (method A50: testing load, 10 N; heating rate, 50° C./hr).

(7) Tm

A differential scanning calorimeter (DSC manufactured by Seiko Instruments Inc.) was used to measure the melting peak temperature (melting peak top temperature Tm) in accordance with JIS K7121 at a heating rate of 10° C./min.

(8) Flexural Modulus

Measurement was made in accordance with JIS K7171-1994.

(9) Tensile Strength at Yield Point

Measurement was made in accordance with JIS K7161-1994.

<Kinds of Resin Ingredients (A) and Compositions and Properties Thereof>

The compositions and properties of the resin ingredients (A) used are shown in Table 1.

[Resin Ingredient (B)]

The following resin ingredients (B) were prepared.

Resin Ingredient B-1: Maleic-Anhydride-Modified Polypropylene (propylene homopolymer modified with maleic anhydride and having a maleic acid component content of 1.8% by weight and an MFR (JIS K7210; 180° C.; 2.16-kg load) of 130 g/10 min)

This resin ingredient B-1 was produced in the following manner.

Into a reactor were charged 900 g of a propylene homopolymer (MFR at 230° C.; 0.5 g/10 min), 150 g of maleic anhydride, and 6,000 g of chlorobenzene. The contents were heated to 130° C. with stirring. Thereafter, a solution prepared by dissolving 70 g of dicumyl peroxide in 500 g of chlorobenzene was introduced into the reactor over 1 hour. The reaction mixture was continuously stirred for 3 hours while keeping the temperature thereof at 120-130° C. to complete the reaction. This reaction was conducted in a nitrogen atmosphere.

After having been cooled, the resultant slurry was washed with a large amount of acetone to sufficiently remove the maleic anhydride remaining ungrafted. The solid matter was dried to obtain a maleic-anhydride-modified polypropylene.

Resin Ingredient B-2: Maleic-Anhydride-Modified Polypropylene (propylene homopolymer modified with maleic anhydride and having a maleic acid component content of 2.8% by weight and an MFR (JIS K7210; 180° C.; 2.16-kg load) of 500 g/10 min)

This resin ingredient B-2 was produced in the following manner.

Into a reactor were charged 900 g of a propylene homopolymer (MFR at 230° C.; 0.5 g/10 min), 300 g of maleic anhydride, and 6,000 g of chlorobenzene. The contents were heated to 130° C. with stirring. Thereafter, a solu-

TABLE 1

| | | Present invention | | | | | For comparison | | |
|---|---|---|---|---|---|---|---|---|---|
| Resin ingredient (A) No. | | A-1 | A-2 | A-3 | A-4 | A-5 | A-X | A-Y | A-Z |
| Component (a1) in resin (A) (wt %) | Content of room-temperature-xylene insolubles | 37 | 29 | 43 | 30 | 40.5 | 27.2 | 45.5 | 45.2 |
| | Content of room-temperature-xylene solubles | 1 | 10 | 5 | 6 | 1.5 | 0.2 | 0.5 | 0.8 |
| | Total (content of component (a1)) | 38 | 39 | 48 | 36 | 42 | 27.4 | 46 | 46.0 |
| Component (a2) in resin (A) (wt %) | Content of room-temperature-xylene insolubles | 15 | 9 | 10 | 11 | 10 | 32.8 | 18 | 6.4 |
| | Content of room-temperature-xylene solubles | 47 | 52 | 42 | 53 | 48 | 39.8 | 36 | 47.6 |
| | Total (content of component (a2)) | 62 | 61 | 52 | 64 | 58 | 72.6 | 54 | 54 |
| | Ethylene content in room-temperature xylene solubles | 25 | 29 | 26 | 30 | 27 | 15.7 | 49 | 41.0 |
| MFR(230)$_A$ (g/10 min) | | 25 | 27 | 5 | 0.4 | 1 | 15 | 0.5 | 0.8 |
| Density (g/cm$^3$) | | 0.88 | 0.88 | 0.88 | 0.88 | 0.88 | 0.89 | 0.88 | 0.88 |
| Vicat softening temperature (° C.) | | 70 | 56 | 84 | 58 | 63 | 102 | 73 | 100 |
| Tm (° C.) | | 163 | 142 | 147 | 149 | 162 | 165 | 162 | 165 |
| Flexural modulus (MPa) | | 85 | 75 | 215 | 90 | 150 | 400 | 350 | 310 |
| Tensile stress at yield point (MPa) | | 11 | 6.1 | 10 | 7.9 | 9 | 15 | 15 | 9 | tion prepared by dissolving 100 g of dicumyl peroxide in 500 g of chlorobenzene was introduced into the reactor over 1 hour. The reaction mixture was continuously stirred for 3 hours while keeping the temperature thereof at 120-130° C. to complete the reaction. This reaction was conducted in a nitrogen atmosphere.

After having been cooled, the resultant slurry was washed with a large amount of acetone to sufficiently remove the maleic anhydride remaining ungrafted. The solid matter was dried to obtain a maleic-anhydride-modified polypropylene.

[Resin Ingredient (C)]

The following resin ingredients (C) were prepared.

As a polypropylene resin (PP) was used "Novatec FY4" manufactured by Japan Polypropylene Corp. As an EVOH was used "Soarnol 4403B" manufactured by The Nippon Synthetic Chemical Industry Co., Ltd. For the adhesive resin layer was used each of the adhesive resin compositions shown in Table 3. The laminated films formed had the thickness ratio shown under I and II below.

Film I:
  PP/adhesive resin layer/EVOH=4/1/3 (thickness ratio)
  Total thickness=80 μm
  (adhesive resin layer thickness=10 μm)

TABLE 2

| Resin ingredient | Trade name | Trade name | Properties | | | |
|---|---|---|---|---|---|---|
| | | | MFR (230° C.) (g/10 min) | Density (g/cm$^3$) | Flexural modulus (MPa) | Tensile strength at yield point (MPa) |
| C-1 | "Novatec FL02C" manufactured by Japan Polypropylene Corp. | propylene/ethylene copolymer (ethylene content, 4.5 wt %) | 20 | 0.90 | 700 | 21 |
| C-2 | "Novatec FL03H" manufactured by Japan Polypropylene Corp. | propylene homopolymer | 25 | 0.90 | 1600 | 34 |
| C-3 | "Tafmer P0375" manufactured by Mitsui Chemicals, Inc. | propylene/ethylene copolymer | 6 | 0.86 | 15 | none |
| C-4 | "Kernel KF360" manufactured by Japan Polyethylene Corp. | ethylene/propylene/butene copolymer | 7 | 0.898 | 20 | none |
| C-5 | "Novatec PP FG4FA" manufactured by Japan Polypropylene Corp. | random polypropylene | 7.8 | 0.90 | 900 | 26 |
| C-6 | "Newcon NF4103" manufactured by Japan Polypropylene Corp. | lowly crystalline polypropylene | 2.5 | 0.88 | 320 | 17 |
| C-7 | "Wintec WFX4T" manufactured by Japan Polypropylene Corp. | random polypropylene | 7 | 0.90 | 700 | 22 |
| C-8 | "Novatec PP FX4E" manufactured by Japan Polypropylene Corp. | random polypropylene | 5.3 | 0.90 | 650 | 22 |
| C-9 | "Novatec PP FY4" manufactured by Japan Polypropylene Corp. | homo polypropylene | 5 | 0.90 | 1500 | 34 |
| C-10 | "Novatec PP BC4ASW" manufactured by Japan Polypropylene Corp. | block polypropylene | 5 | 0.90 | 1250 | 27 |
| C-11 | "Tafmer S4030" manufactured by Mitsui Chemicals, Inc. | propylene/ethylene copolymer | 0.4 | 0.86 | 15 | none |

EXAMPLES 1 TO 8 AND COMPARATIVE EXAMPLES 1 TO 9

<Preparation of Adhesive Resin Compositions>

With respect to each of the Examples and Comparative Examples, the resin ingredient (A), resin ingredient (B), and resin ingredient (C) of the kinds shown in Table 3 were mixed together in the respective amounts shown in the table so that the total amount of these became 100% by weight. To 100 parts by weight of the sum of these were added 0.2 parts by weight of a phenolic antioxidant (Irganox 1010, manufactured by Ciba Specialty Chemicals Co.), 0.1 part by weight of a phosphorus compound antioxidant (Irgafos 168, manufactured by Ciba Specialty Chemicals Co.), and 0.03 parts by weight of a neutralizing agent (Alcamizer DHT-4A, manufactured by Kyowa Chemical Co., Ltd.). The ingredients were mixed together by means of a supermixer for 1 minute. This mixture was melt-kneaded with twin-screw extruder "PCM 30φ" (set temperature, 210° C.), manufactured by Ikegai Corp., under the conditions of a screw rotation speed of 100 rpm and an extrusion rate of 10 kg/h, extruded into a strand, cooled, and then cut into pellets. Thus, adhesive resin compositions were obtained.

<Formation of Three-Layer Laminated Films>

A 3-resin 3-layer T-die molding machine manufactured by Placo Co., Ltd. was used to form three-layer laminated films each composed of a polypropylene resin/adhesive resin layer/EVOH by three-layer coextrusion molding (die temperature, 230° C.).

Film II:
  PP/adhesive resin layer/EVOH=4/1/3 (thickness ratio)
  Total thickness=40 μm
  (adhesive resin layer thickness=5 μm)

<Formation of Single-Layer Film>

A T-die single-layer molding machine manufactured by Placo Co., Ltd. was used to form a film having a thickness of 30 μm from each adhesive resin composition.

<Evaluation>

The three-layer laminated films or single-layer film obtained was subjected to the following evaluation. The results obtained are shown in Table 3.

(1) Adhesion Strength

The three-layer laminated films were examined for the strength of adhesion (g/cm) between the EVOH layer and the adhesive resin layer under the following conditions.
  Peeling width: 10 mm
  Peeling mode: T-peel
  Peeling rate: 300 mm/min
  Measuring atmosphere temperature: 23° C. or 80° C.

In the table, "≧" indicates that peeling proceeded while the base was elongated; and ">" indicates that the base broke immediately after peeling initiation.

(2) Fish-Eye

A surface of the single-layer film was visually examined to count the number of fish-eyes having a diameter of 0.2 mm or larger per area of 20 cm×20 cm. Fish-eye numbers of 20 and smaller were taken as a practical level.

TABLE 3

| | | | Example | | | | | | | | Comparative Example | |
|---|---|---|---|---|---|---|---|---|---|---|---|---|
| | | | 1 | 2 | 3 | 4 | 5 | 6 | 7 | 8 | 1 | 2 |
| Adhesive resin composition Formulation (wt %) | Resin ingredient (A) | A-1 | 90 | 90 | 80 | 97 | 50 | 20 | 50 | 87 | — | — |
| | | A-X | — | — | — | — | — | — | — | — | — | — |
| | | A-Z | — | — | — | — | — | — | — | — | — | — |
| | Resin ingredient (B) | B-1 | 10 | — | 20 | 3 | 3 | 3 | 3 | 3 | 3 | 3 |
| | | B-2 | — | 10 | — | — | — | — | — | — | — | — |
| | Resin ingredient (C) | C-1 | — | — | — | — | 47 | 77 | — | — | 97 | — |
| | | C-2 | — | — | — | — | — | — | 47 | — | — | 97 |
| | | C-3 | — | — | — | — | — | — | — | 10 | — | — |
| Adhesion strength (g/cm) | Film I | 23° C. | >900 | >900 | >900 | 350 | 330 | 300 | 290 | ≧510 | 190 | 110 |
| | | 80° C. | — | — | — | 280 | 380 | — | 350 | 300 | — | — |
| | Film II | 23° C. | ≧790 | ≧790 | ≧800 | 360 | 320 | 280 | 280 | 320 | 180 | 100 |
| Number of fish-eyes | | | 9 | 14 | 12 | 6 | 7 | 8 | 5 | 4 | — | — |

| | | | Comparative Example | | | | | | | | |
|---|---|---|---|---|---|---|---|---|---|---|---|
| | | | 3 | 4 | 5 | 6 | 7 | 8 | 9 | 31 | 32 |
| Adhesive resin composition Formulation (wt %) | Resin ingredient (A) | A-1 | — | — | 100 | — | — | — | — | — | — |
| | | A-X | — | — | — | — | — | 100 | 90 | — | — |
| | | A-Z | — | — | — | — | — | — | — | 100 | 90 |
| | Resin ingredient (B) | B-1 | 3 | 3 | — | — | — | — | 10 | — | 10 |
| | | B-2 | — | — | — | — | — | — | — | — | — |
| | Resin ingredient (C) | C-1 | 87 | 49 | — | 100 | — | — | — | — | — |
| | | C-2 | — | — | — | — | 100 | — | — | — | — |
| | | C-3 | 10 | 48 | — | — | — | — | — | — | — |
| Adhesion strength (g/cm) | Film I | 23° C. | 200 | 300 | 0 | 0 | 0 | 0 | ≧700 | 0 | ≧710 |
| | | 80° C. | 13 | 10 | — | — | — | — | — | — | — |
| | Film II | 23° C. | 190 | 290 | 0 | 0 | 0 | 0 | 390 | 0 | 400 |
| Number of fish-eyes | | | — | — | — | — | — | — | 35 | — | 33 |

EXAMPLE 9 AND COMPARATIVE EXAMPLES 10 AND 11

<Preparation of Adhesive Resin Compositions>

Adhesive resin compositions were obtained in the same manner as in Examples 1 to 8 and Comparative Examples 1 to 9, except that the resin formulations were changed to those shown in Table 4.

<Formation of Three-Layer Laminated Films>

Three-layer laminated films were formed in the same manner as in Examples 1 to 8 and Comparative Examples 1 to 9, except that the film constitutions and die temperature shown under III and IV below were used.

As a polyethylene resin (PE) was used "Novatec SF8402" manufactured by Japan Polychem Corp. As a polypropylene resin (PP) was used "Novatec FY4" manufactured by Japan Polychem Corp. As a polyester resin (PET) was used "PA500D" manufactured by Mitsubishi Rayon Co., Ltd. For the adhesive resin layer was used each of the adhesive resin compositions shown in Table 4.

Film III:
PE/adhesive resin layer/PET=4/1/3 (thickness ratio)
Total thickness=80 μm
(adhesive resin layer thickness=10 μm)
Die temperature: 265° C.

Film IV:
PP/adhesive resin layer/PET=4/1/3 (thickness ratio)
Total thickness=80 μm
(adhesive resin layer thickness=10 μm)
Die temperature: 265° C.

<Evaluation>

The three-layer laminated films obtained were examined for the strength of adhesion between the PET layer and the adhesive resin layer and the strength of adhesion between the PE or PP layer and the adhesive resin layer in the same manner as in Examples 1 to 8 and Comparative Examples 1 to 9.

The results obtained are shown in Table 4.

It can be seen from Table 4 that the resin ingredient (A) plays an important role in adhesiveness to PET.

TABLE 4

| | | | | Example | Comparative Example 10 | Comparative Example 11 |
|---|---|---|---|---|---|---|
| | | | | Example 9 | | |
| Adhesive resin composition Formulation (wt %) | Resin ingredient A-2 | | | 60 | — | — |
| | Resin ingredient B-1 | | | 10 | 10 | 10 |
| | Resin ingredient C-1 | | | — | 60 | — |
| | Resin ingredient C-3 | | | 30 | 30 | 30 |
| | Resin ingredient C-4 | | | — | — | 60 |
| Adhesion strength (g/cm) | Film III | PET/adhesive layer | 23° C. | 250 | not adherent | 2 |
| | | PE/adhesive layer | 23° C. | not peeled off * | not adherent | not peeled off * |
| | Film IV | PET/adhesive layer | 23° C. | 250 | 0 | not adherent |
| | | | 80° C. | 260 | — | — |
| | | PP/adhesive layer | 23° C. | not peeled off * | not peeled off * | not adherent |
| | | | 80° C. | not peeled off * | — | — |

* Not peeled off: peeling occurred not between the two layers but at the other bonding interface; the same applies hereinafter.

EXAMPLES 10 TO 27 AND COMPARATIVE EXAMPLES 12 TO 30

<Preparation of Adhesive Resin Compositions>

Adhesive resin compositions were obtained in the same manner as in Examples 1 to 8 and Comparative Examples 1 to 9, except that the resin formulations were changed to those shown in Tables 5 to 7.

<Formation of Three-Layer Laminated Films>

Three-layer laminated films were formed in the same manner as in Examples 1 to 8 and Comparative Examples 1 to 9, except that the film constitutions and die temperature shown under V and VI below were used.

As an amorphous poly(ethylene terephthalate) resin (PET) was used "6763" manufactured by Eastman Chemical Co. (Vicat softening temperature (ASTM D1525), 82° C.; glass transition temperature (Tg), 81° C.). As a homo polypropylene (PP) was used "Novatec PP FY4" manufactured by Japan Polypropylene Corp. (MFR (230° C.), 5 g/10 min; density, 0.90 g/cm³). As a linear polyethylene (PE) was used "Novatec LLD SF8402" manufactured by Japan Polyethylene Corp. (MFR (190° C.), 3 g/10 min; density, 0.93 g/cm³). For the adhesive resin layer was used each of the adhesive resin compositions shown in Tables 5 to 7.

Film V:
PE/adhesive resin layer/PET=4/1/4 (thickness ratio)
Total thickness=90 μm
(adhesive resin layer thickness=10 μm)
Die temperature: 240° C.

Film VI:
PP/adhesive resin layer/PET=4/1/4 (thickness ratio)
Total thickness=90 μm
(adhesive resin layer thickness=10 μm)
Die temperature: 240° C.

<Evaluation>

The three-layer laminated films obtained were examined for the strength of adhesion between the PET layer and the adhesive resin layer and the strength of adhesion between the PE or PP layer and the adhesive resin layer in the same manner as in Examples 1 to 8 and Comparative Examples 1 to 9.

The results obtained are shown in Tables 5 to 7.

Incidentally, adhesion strengths of 50 g/cm and higher are in a practicable range, and adhesion strengths of 100 g/cm and higher are especially satisfactory. In the films which had an adhesion strength of 250 g/cm or higher, a blushing phenomenon (material failure) was observed in the surfaces peeled off. As apparent from these results, the adhesive resin compositions of the invention have highly satisfactory adhesiveness to PET.

TABLE 5

| | | | | Example | | | | Comparative Example | | |
|---|---|---|---|---|---|---|---|---|---|---|
| | | Example | | 10 | 11 | 12 | 13 | 12 | 13 | 14 |
| Adhesive resin composition Formulation (wt %) | | Resin ingredient A-2 | | 90 | — | — | — | — | — | — |
| | | Resin ingredient A-3 | | — | 90 | — | — | — | — | — |
| | | Resin ingredient A-4 | | — | — | 90 | — | — | — | — |
| | | Resin ingredient A-5 | | — | — | — | 90 | — | — | — |
| | | Resin ingredient A-Y | | — | — | — | — | 90 | — | — |
| | | Resin ingredient A-X | | — | — | — | — | — | 90 | — |
| | | Resin ingredient A-Z | | — | — | — | — | — | — | — |
| | | Resin ingredient B-1 | | 10 | 10 | 10 | 10 | 10 | 10 | 10 |
| | | Resin ingredient C-5 | | — | — | — | — | — | — | 90 |
| | | Resin ingredient C-6 | | — | — | — | — | — | — | — |
| | | Resin ingredient C-7 | | — | — | — | — | — | — | — |
| | | Resin ingredient C-8 | | — | — | — | — | — | — | — |
| | | Resin ingredient C-9 | | — | — | — | — | — | — | — |
| | | Resin ingredient C-10 | | — | — | — | — | — | — | — |
| | | Resin ingredient C-11 | | — | — | — | — | — | — | — |
| Adhesion strength (g/cm) | Film V | PET/adhesive layer | 23° C. | 490 | 250 | — | — | — | 0 | 0 |
| | | PE/adhesive layer | 23° C. | not peeled off | not peeled off | — | — | — | not adherent | not adherent |
| | Film VI | PET/adhesive layer | 23° C. | 500 | 250 | 100 | 70 | 10 | 0 | 0 |
| | | PP/adhesive layer | 23° C. | not peeled off | not peeled off | not peeled off | not peeled off | not peeled off | not peeled off | not peeled off |

| | | | Comparative Example | | | | | | |
|---|---|---|---|---|---|---|---|---|---|
| | Example | | 15 | 16 | 17 | 18 | 19 | 20 | 33 |
| Adhesive resin composition Formulation (wt %) | Resin ingredient A-2 | | — | — | — | — | — | — | — |
| | Resin ingredient A-3 | | — | — | — | — | — | — | — |
| | Resin ingredient A-4 | | — | — | — | — | — | — | — |
| | Resin ingredient A-5 | | — | — | — | — | — | — | — |
| | Resin ingredient A-Y | | — | — | — | — | — | — | — |
| | Resin ingredient A-X | | — | — | — | — | — | — | — |
| | Resin ingredient A-Z | | — | — | — | — | — | — | 90 |
| | Resin ingredient B-1 | | 10 | 10 | 10 | 10 | 10 | 10 | 10 |
| | Resin ingredient C-5 | | — | — | — | — | — | — | — |
| | Resin ingredient C-6 | | 90 | — | — | — | — | — | — |
| | Resin ingredient C-7 | | — | 90 | — | — | — | — | — |
| | Resin ingredient C-8 | | — | — | 90 | — | — | — | — |
| | Resin ingredient C-9 | | — | — | — | 90 | — | — | — |
| | Resin ingredient C-10 | | — | — | — | — | 90 | — | — |
| | Resin ingredient C-11 | | — | — | — | — | — | 90 | — |

TABLE 5-continued

| | | | | | | | | | | |
|---|---|---|---|---|---|---|---|---|---|---|
| Adhesion strength (g/cm) | Film V | PET/adhesive layer | 23° C. | 0 | 0 | 0 | 0 | 0 | 10 | 0 |
| | | PE/adhesive layer | 23° C. | not adherent | not adherent | not adherent | not adherent | not adherent | 10 | not adherent |
| | Film VI | PET/adhesive layer | 23° C. | 0 | 0 | 0 | 0 | 0 | 10 | 0 |
| | | PP/adhesive layer | 23° C. | not peeled off | not peeled off | not peeled off | not peeled off | not peeled off | 10 | not peeled off |

TABLE 6

| | | | Example | | | | | | |
|---|---|---|---|---|---|---|---|---|---|
| | Example | | 14 | 15 | 16 | 17 | 18 | 19 | 20 |
| Adhesive resin composition Formulation (wt %) | Resin ingredient A-2 | | 70 | 75 | 78 | 79 | 90 | 50 | 85 |
| | Resin ingredient A-3 | | — | — | — | — | — | — | — |
| | Resin ingredient A-4 | | — | — | — | — | — | — | — |
| | Resin ingredient A-X | | — | — | — | — | — | — | — |
| | Resin ingredient B-1 | | 10 | 5 | 2 | 1 | 5 | 5 | 5 |
| | Resin ingredient C-5 | | — | — | — | — | — | — | 10 |
| | Resin ingredient C-11 | | 20 | 20 | 20 | 20 | 5 | 45 | — |
| | Resin ingredient C-3 | | — | — | — | — | — | — | — |
| Adhesion strength (g/cm) | Film V | PET/adhesive layer | 23° C. | 500 | — | — | — | — | — | — |
| | | PE/adhesive layer | 23° C. | not peeled off | — | — | — | — | — | — |
| | Film VI | PET/adhesive layer | 23° C. | 550 | 530 | 500 | 200 | 530 | 510 | 460 |
| | | PP/adhesive layer | 23° C. | not peeled off | not peeled off | not peeled off | not peeled off | not peeled off | not peeled off | not peeled off |

| | | | Example | | | | | | |
|---|---|---|---|---|---|---|---|---|---|
| | Example | | 21 | 22 | 23 | 24 | 25 | 26 | 27 |
| Adhesive resin composition Formulation (wt %) | Resin ingredient A-2 | | 70 | 75 | 55 | 50 | — | — | 70 |
| | Resin ingredient A-3 | | — | — | — | 45 | 75 | — | — |
| | Resin ingredient A-4 | | — | — | — | — | — | 75 | — |
| | Resin ingredient A-X | | — | 20 | 20 | — | — | — | — |
| | Resin ingredient B-1 | | 5 | 5 | 5 | 5 | 5 | 5 | 10 |
| | Resin ingredient C-5 | | 25 | — | — | — | — | — | — |
| | Resin ingredient C-11 | | — | — | 20 | — | 20 | 20 | — |
| | Resin ingredient C-3 | | — | — | — | — | — | — | 20 |
| Adhesion strength (g/cm) | Film V | PET/adhesive layer | 23° C. | — | — | — | — | — | — | — |
| | | PE/adhesive layer | 23° C. | — | — | — | — | — | — | — |
| | Film VI | PET/adhesive layer | 23° C. | 250 | 210 | 250 | 300 | 250 | 250 | 540 |
| | | PP/adhesive layer | 23° C. | not peeled off | not peeled off | not peeled off | not peeled off | not peeled off | not peeled off | not peeled off |

TABLE 7

| | | Comparative Example | | | | | | | | | | |
|---|---|---|---|---|---|---|---|---|---|---|---|---|
| | Example | 21 | 22 | 23 | 24 | 25 | 26 | 27 | 28 | 29 | 30 | 34 |
| Adhesive resin composition Formulation (wt %) | Resin ingredient A-Y | 75 | — | — | 75 | — | — | — | — | — | — | — |
| | Resin ingredient A-X | — | 75 | 35 | — | — | — | — | — | — | — | — |
| | Resin ingredient A-Z | — | — | — | — | — | — | — | — | — | — | 75 |
| | Resin ingredient B-1 | 5 | 5 | 5 | 5 | 5 | 5 | 5 | 5 | 5 | 5 | 5 |
| | Resin ingredient C-5 | — | — | — | — | 75 | 35 | 35 | — | — | — | — |
| | Resin ingredient C-7 | — | — | — | — | — | — | — | 75 | — | — | — |
| | Resin ingredient C-10 | — | — | — | — | — | — | — | — | 75 | 35 | — |
| | Resin ingredient C-11 | 20 | 20 | 60 | 20 | 20 | 60 | — | 20 | 20 | 60 | 20 |
| | Resin ingredient C-3 | — | — | — | — | — | — | 60 | — | — | — | — |

TABLE 7-continued

| | | | | Comparative Example | | | | | | | | | | |
|---|---|---|---|---|---|---|---|---|---|---|---|---|---|---|
| | | Example | | 21 | 22 | 23 | 24 | 25 | 26 | 27 | 28 | 29 | 30 | 34 |
| Adhesion strength (g/cm) | Film V | PET/adhesive layer | 23° C. | — | — | — | — | — | — | — | — | — | — | — |
| | | PE/adhesive layer | 23° C. | — | — | — | — | — | — | — | — | — | — | — |
| | Film VI | PET/adhesive layer | 23° C. | 30 | 10 | 20 | 30 | 0 | 10 | 20 | 10 | 0 | 5 | 20 |
| | | PP/adhesive layer | 23° C. | not peeled off | not peeled off | not peeled off | not peeled off | not peeled off | not peeled off | not peeled off | not peeled off | not peeled off | not peeled off | not peeled off |

It can be seen from the results given above that the adhesive resin composition of the invention is excellent in adhesiveness to polyolefin resins, polyester resins, EVOH, etc. and in heat-resistant adhesiveness and is free from the problem of fish-eyes. Consequently, it can be seen that with this adhesive resin composition, high-quality laminates having excellent durability can be provided.

While the invention has been described in detail and with reference to specific embodiments thereof, it will be apparent to one skilled in the art that various changes and modifications can be made therein without departing from the spirit and scope thereof.

This application is based on a Japanese patent application filed on Sep. 2, 2005 (Application No. 2005-255193) and a Japanese patent application filed on Jun. 9, 2006 (Application No. 2006-161184), the contents thereof being herein incorporated by reference.

Industrial Applicability

The adhesive resin composition of the invention is excellent in adhesiveness especially to polyester resins, in particular PET (poly(ethylene terephthalate) resins), and in heat resistance thereof, because it contains resin ingredient (A) obtained by successive polymerization. In addition, since this resin ingredient (A) has a specific composition, the adhesive resin composition provided is free from defects such as fish-eyes and has excellent film-forming properties. The invention hence has a significant industrial value.

The invention claimed is:

1. An adhesive resin composition, comprising, by weight:
10-99.5% of a resin ingredient (A), which is a product of a successive propylene polymerization in the form of a polymer comprising
10-60% by weight of (a1) a propylene homopolymer or a copolymer of propylene and at least one second α-olefin comprising 2-8 carbon atoms, and
40-90% by weight of (a2) a copolymer of propylene, ethylene, and optionally at least one third α-olefin comprising 2-8 carbon atoms,
obtained by polymerizing to obtain (a1) and then further polymerizing to obtain (a2);
0.5-30% of a resin ingredient (B), which is a propylene homopolymer or a propylene copolymer which each has been modified with at least one modifier selected from the group consisting of an unsaturated carboxylic acid and a derivative thereof, so that the content of the component derived from the unsaturated carboxylic acid and/or derivative thereof is 0.01% by weight or higher; and
0-89.5% of a resin ingredient (C), which is an olefin resin, wherein a content by weight, based on the resin ingredient (A), of
(1) room-temperature-xylene solubles derived from component (a1)) is 1-20%,
(2) room-temperature-xylene insolubles derived from component (a2) is lower than 20%,
(3) room-temperature-xylene solubles derived from component (a2) is 10-60%, and wherein
(4) the room-temperature-xylene solubles derived from component (a2) have a content of α-olefins excluding propylene of 20% by weight or higher.

2. The composition of claim 1, wherein the resin ingredient (B) has an $MFR(180)_B$ of 30-1,000 g/10 min at 180° C. under a 2.16-kg load, and
wherein a ratio of the $MFR(180)_B$ to an $MFR(230)_A$ of the resin ingredient (A) measured in g/10 min at 230° C. under a 2.16 kg load ($MFR(180)_B/MFR(230)_A$) is 1-10,000.

3. The composition of claim 1, wherein the room-temperature-xylene solubles in the component (a2) have an ethylene content of 20-40% by weight based on the resin ingredient (A).

4. The composition of claim 1, wherein the component (a2) in the resin ingredient (A) is a copolymer of propylene and ethylene.

5. The composition of claim 1, wherein the component (a1) in the resin ingredient (A) is a propylene homopolymer.

6. The composition of claim 1, wherein the component (a1) and the component (a2) in the resin ingredient (A) each are a copolymer of propylene and ethylene.

7. The composition of claim 1, wherein the resin ingredient (A) has a flexural modulus of from 50 MPa to lower than 300 MPa (lower than about 3,000 kg/cm$^2$).

8. The composition of claim 7, wherein the resin ingredient (A) has a tensile strength at yield point of 3 MPa or higher.

9. The composition of claim 7, wherein the resin ingredient (A), when examined for a melting point by the DSC method, has a peak top value Tm of 162° C. or lower.

10. The composition of claim 1, wherein the resin ingredient (A) has an $MFR(230)_A$ of 0.1-50 g/10 min.

11. The composition of claim 1, wherein the resin ingredient (C) is a propylene homopolymer or a copolymer of propylene and one or more α-olefins and has a propylene content of 5-100% by weight.

12. A laminate, comprising an adhesive resin layer comprising the composition of claim 1.

13. The laminate of claim 12, further comprising:
a second layer comprising at least one material selected from the group consisting of a polypropylene resin, a polyethylene resin, a ethylene/vinyl alcohol copolymer resin, a polyamide resin, a polyester resin, a metal, paper, a nonwoven fabric, and a woven fabric,
wherein the laminate has superposed layers comprising the adhesive resin layer and the second layer.

14. The laminate of claim 13, comprising the adhesive resin layer and a polyester resin layer superposed on at least one side of the adhesive resin layer.

15. The laminate of claim 13, comprising the adhesive resin layer and a polyethylene resin layer superposed on at least one side of the adhesive resin layer.

16. The laminate of claim 13, comprising the adhesive resin layer, a polyester resin layer superposed on one side of the adhesive resin layer, and a polyethylene resin layer superposed on the other side of the adhesive resin layer.

17. The laminate of claim 14, wherein a ratio of a thickness of the adhesive resin layer to a thickness of the polyester resin layer is from 1:100 to 1:1.

18. The laminate of claim 12, wherein a polyester resin layer is superposed on the adhesive resin layer so as to be in direct contact with the adhesive resin layer, and
wherein a strength of adhesion between the adhesive resin layer and the polyester resin layer is 70 g/cm or higher at each of measuring atmosphere temperatures of 23° C. and 80° C.

19. The laminate of claim 18, wherein the polyester resin layer is a poly(ethylene terephthalate) layer.

20. The laminate of claim 18, wherein the strength of adhesion between the layers is 100 g/cm or higher at each of measuring atmosphere temperatures of 23° C. and 80° C.

21. The laminate of claim 20, wherein the strength of adhesion between the layers is 200 g/cm or higher at each of measuring atmosphere temperatures of 23° C. and 80° C.

* * * * *